(12) United States Patent
Rubin

(10) Patent No.: US 7,996,249 B2
(45) Date of Patent: Aug. 9, 2011

(54) METHOD FOR BENCHMARKING OF INFORMATION TECHNOLOGY SPENDING

(76) Inventor: Howard A. Rubin, Pound Ridge, NY (US)

( * ) Notice: Subject to any disclaimer, the term of this patent is extended or adjusted under 35 U.S.C. 154(b) by 684 days.

(21) Appl. No.: 12/132,546

(22) Filed: Jun. 3, 2008

(65) Prior Publication Data

US 2008/0300968 A1    Dec. 4, 2008

Related U.S. Application Data

(60) Provisional application No. 60/941,898, filed on Jun. 4, 2007.

(51) Int. Cl.
*G06Q 10/00* (2006.01)
(52) U.S. Cl. .................................... 705/7.11; 705/35
(58) Field of Classification Search .............. None
See application file for complete search history.

(56) References Cited

U.S. PATENT DOCUMENTS

| | | | |
|---|---|---|---|
| 7,574,694 B2 * | 8/2009 | Mangan et al. .......... 717/123 |
| 7,680,754 B2 * | 3/2010 | Hillier .................. 706/47 |
| 7,725,343 B2 * | 5/2010 | Johanson et al. ........ 705/7.37 |
| 2003/0158800 A1 * | 8/2003 | Pisello et al. ............ 705/35 |
| 2004/0044544 A1 * | 3/2004 | Smith et al. ............. 705/1 |
| 2004/0220792 A1 * | 11/2004 | Gallanis et al. .......... 703/13 |
| 2004/0225583 A1 * | 11/2004 | Joodi ................... 705/35 |
| 2005/0071286 A1 * | 3/2005 | Laicher et al. .......... 705/400 |
| 2005/0071348 A1 * | 3/2005 | Laicher et al. .......... 707/100 |
| 2005/0086335 A1 * | 4/2005 | Liu et al. ............... 709/223 |
| 2006/0129518 A1 * | 6/2006 | Andreev et al. .......... 707/1 |
| 2006/0242261 A1 * | 10/2006 | Piot et al. .............. 709/217 |
| 2007/0118551 A1 * | 5/2007 | Akkiraju et al. ......... 707/102 |

OTHER PUBLICATIONS

Strassmann, Paul A. "Defining and Measuring Information Productivity Including 2002 Productivity Ranking of 1,319 International Firms," New Canaan, Connecticut 06840-0264, V.2, 2004.*
Excel Tutorial on Advanced Graphing and Curve Fitting, Dec. 5, 2002 Retrieved from http://www.archive.org on Mar. 29, 2011.*
Varian, Hal R., "Microeconomics Analysis," Third Edition, Copyright @ 1992, 1984, 1978 by W. W. Norton & Company, Inc. ISBN 0-393-95735-7, pp. 1-10, 23-26, 201-202, 410-411, 474.*
investopidia.com webpages (Earning Before Income Taxes), Oct. 17, 2000 Retrieved from http://www.archive.org/ on Mar. 28, 2011.*
Howard Rubin Technology Economics Software_Process V3.0., Jun. 2007 http://kuperpresents.com/nycspin-new/Howard_Rubin_Technology_Economics 2007 Software_Process_V3.0.ppt.*
Jed Rubin, Dr. Howard Rubin, Worldwide IT Benchmark Report 2006: Introduction: Executive Summary, Gartner 2005.*

(Continued)

*Primary Examiner* — Lynda Jasmin
*Assistant Examiner* — Octavian Rotaru
(74) *Attorney, Agent, or Firm* — SNR Denton US LLP

(57) ABSTRACT

Information technology (IT) spending by a subject entity is assessed against an industry-wide optimal value of an IT benchmark and a result of that assessment displayed. Importantly, the IT benchmark developed by the present inventor accounts for the subject entity's IT spending as a percentage of the entity's revenue and the entity's IT spending as a percentage of the entity's operating expenses. For the industry as a whole, the optimal value of the IT benchmark is determined on the basis of profitability measures for individual companies within the industry. This process may be performed as part of a larger analysis concerning the subject entity's operations to provide an overall assessment of the entity's financial performance, health, etc.

11 Claims, 2 Drawing Sheets

OTHER PUBLICATIONS

Pisello, Thomas Return on Investment, for Information Technology Providers, Using ROI as a Selling and Management Tool, the Information Economics, 2001, Press P.O. Box 264, New Canaan, Connecticut 06840-0264.*

Proceedings of the 13th European Conference on Information Technology Evaluation Genoa, Italy, Sep. 28-29, 2006, Edited by Dr Dan Remenyi, Trinity College Dublin, Ireland and Dr Ann Brown, CASS Business School, London, UK, Published by Academic Conferences Limited, Reading UK 44-118-972-4148, 2006. All Rights Reserved, ISBN: 978-1-905305-34-6.*

Dr. Howard A. Rubin, Breakthroughs in IT Measurement, Benchmarking, Scorecards, Catalogs, and Communication, META Group 2004.*

Value Measuring Methodology, How to Guide, CIO Council, Best Practices Committee, (pp. 1-67), 2002.*

Michael L. Orlov, Multiple Linear Regression Analysis Using Microsoft Excel, Chemistry Department, Oregon State University 1996 www.chem.orst.edu/courses/ch361-464/ch464/RegrssnFnl.pdf.*

Baker, Measuring the Immeasurable, Ciolnsight OI 2007 http://edwardhbaker.com/images/CIOI_Productivity_Jan_07.pdf.*

Oz Effy, The Vanishing IT Productivity A Simple Theory, Proceedings of the 36th Hawaii Intyernational Conferance on System Sciences 2003 http://www.hicss.hawaii.edu/HICSS36/HICSSpapers/OSKBE02.pdf.*

Hitt Lorin M, Beyond the productivity paradox, Forthcoming in the Communications of the ACM, Aug. 1998 http://ebusiness.mit.edu/erik/bpp.pdf.*

Ebert Christof, Measuring and improving productivity, Alcatel, Zurich, Set 2006 http://ebusiness.mit.edu/erik/bpp.pdf.*

Card David N, The Challenge of Productivity Measurement, Pacific Northwest Software Quality Conference, 2006 http://www.compaid.com/caiinternet/ezine/card-prod.pdf.*

Hu Qing, Information Intensity and Impact of IT Investments on Productivity http://csrc.lse.ac.uk/asp/aspecis/20030064.pdf.*

Brynjolfsson Erik, ROI Valution, the IT productivity GAP, Issue 21, Jul. 2003 www.definitivemeasures.comFeatureContentROI%20Valuation.pdf.*

Mason et al, the IT productivity Paradox revisited, Vierteljahrshefte zur Wirtschaftsforschung, 69 Jahrgang, Heft 42000, S 618 629 http://www.diw.de/documents/dokumentenarchiv/17/38279/v_00_4_10.pdf.*

Brynjolfsson Erik, IT as a Factor of Production, Sloan Working Paper 3715, Aug. 1994 http://dspace.mit.edu/bitstream/handle/1721.1/2526/SWP-3715-31683534-CCS-173.pdf?sequence=1.*

Rubin Howard A, Information Strategy, The Executive Journal, V 11, i4, p13, isbn 07438613, 1995 Rubin Howard, Information Strategy, Executive Journal,V11,i4, p. 13, isbn 07438613.pdf.*

Gartner Industry Research report ID No. 600167423, "IT Intensity: An Overview for Banking and Investment Services". p. 1, Apr. 20, 2009.

Paul A. Strassmann, "Six Rules for Finding IT Value", Cutter IT Journal. vol. 17, No. 8, pp. 5-9 (2004); 5 pages.

Krishna Roy, "Collaborative Commerce to 'Dramatically Alter Industrial Economics'", Collaborative News, Feb. 1, 2002, 2 pages.

* cited by examiner

METHOD FOR BENCHMARKING OF INFORMATION TECHNOLOGY SPENDING

RELATED APPLICATIONS

This application is a NONPROVISIONAL of, claims the priority benefit of, and incorporates by reference U.S. Provisional Patent Application 60/941,898, filed 4 Jun. 2007.

FIELD OF THE INVENTION

The present invention relates techniques to benchmark a company's or other entity's spending on information technology, and includes the defining of unique metrics to use in such benchmark analyses.

BACKGROUND

The process of setting "benchmarks," i.e., identifying accurate historical data against with a data set can be compared now and in the future, is often used to evaluate business proposals and operations. Business leaders often find it useful to measure their own companies' revenue, profits, etc., against that of their competitors or companies considered industry leaders in order to evaluate their organizations' position within an industry (and, perhaps, to spur changes within their respective organizations). Indeed, benchmarking has become one of the foundations of modern business management.

One area of business operation that is sorely in need of accurate benchmarking tools is information technology (IT) spending (i.e., spending on IT-related goods and services). Perhaps unlike the situation in the late 1990s, today business leaders are demanding that IT departments justify new spending initiatives (as well as existing spending on items such as personnel, equipment, applications, training, etc.), before approving same. As these demands have increased, others have tried to adopt benchmarking approaches as a means for such justifications.

Indeed, IT benchmarking has become its own industry. Consulting service providers such as Gartner, Inc. have devoted significant resources to gathering data concerning IT spending in many businesses across many different industries. Reports reflecting the results of such data gathering sell for hundreds if not thousands of dollars. But the raw data concerning IT spending that is presented in such reports is often difficult for laypersons to comprehend. For example, while figures for hundreds of companies in a given industry across categories such as staffing costs, IT budget as a percentage of revenue, IT spending per employee, IT spending per timekeeper, IT operational budget allocations, IT operational budget changes, IT operational budget per desktop, and so on offer a rich source of raw information, these numbers offer little insight into the underlying question of whether a company is getting the appropriate value for its IT spending.

For these and similar reasons, effective benchmarking tools for IT spending are needed.

SUMMARY OF THE INVENTION

In accordance with embodiments of the present invention, IT spending by a company or other entity is assessed against an optimal value of an IT benchmark. This optimal value is determined on an industry-wide basis. Results of the assessment may be displayed or may be considered along with other financial indicators for the subject entity as part of a larger analysis concerning the subject entity's operations. This may provide an overall assessment of the entity's financial performance, health, etc. The IT benchmark used in this process accounts for the subject entity's IT spending as a percentage of the entity's revenue and the entity's IT spending as a percentage of the entity's operating expenses. For the industry as a whole, the optimal value of the IT benchmark may be determined on the basis of profitability measures for individual companies within the industry.

In one particular embodiment of the invention, the sufficiency of a target company's spending on IT resources is evaluated or assessed by determining, for a subject industry as represented by a set of selected companies within that industry, an optimal value of an IT metric (as determined by a maximum value of a profitability metric for the selected companies); comparing a value of the IT metric computed for the target company with the optimal value of the IT metric for the subject industry; and, based on the result of this comparison, determining whether the target company is spending too much or too little on IT resources. As indicated above, the IT metric used in these analses is computed based on a subject entity's IT spending as a percentage of the subject entity's revenue and it's IT spending as a percentage of the subject entity's operating expenses. For example, the IT metric may be a value equal to a square root of a sum of a square of the subject entity's IT spending as a percentage of the subject entity's revenue and a square of the subject entity's IT spending as a percentage of the subject entity's operating expenses. In some cases, the profitability metric used for this analysis may be gross profitability, which for each respective one of the selected companies may be regarded as a value equal to net revenue of the respective company less a ratio of operating expenses to net revenue for the respective selected company. In some cases, the above-described processes will be instantiated on computer-readable media as computer-readable instructions for execution by a computer processor.

In various embodiments of the invention, the optimal value of the IT metric may be determined by fitting one or more curves through data points representing, for each respective selected company, a measure of the profitability metric versus the IT metric for the respective selected company. In the case of multiple curve fittings, an average of the various optimal values for the IT metric produced by each curve fitting iteration may be used. These and other features of the present invention are described in detail below.

BRIEF DESCRIPTION OF THE DRAWINGS

The present invention is illustrated by way of example, and not limitation, in the figures of the accompanying drawings, in which.

DETAILED DESCRIPTION

Figure 1:
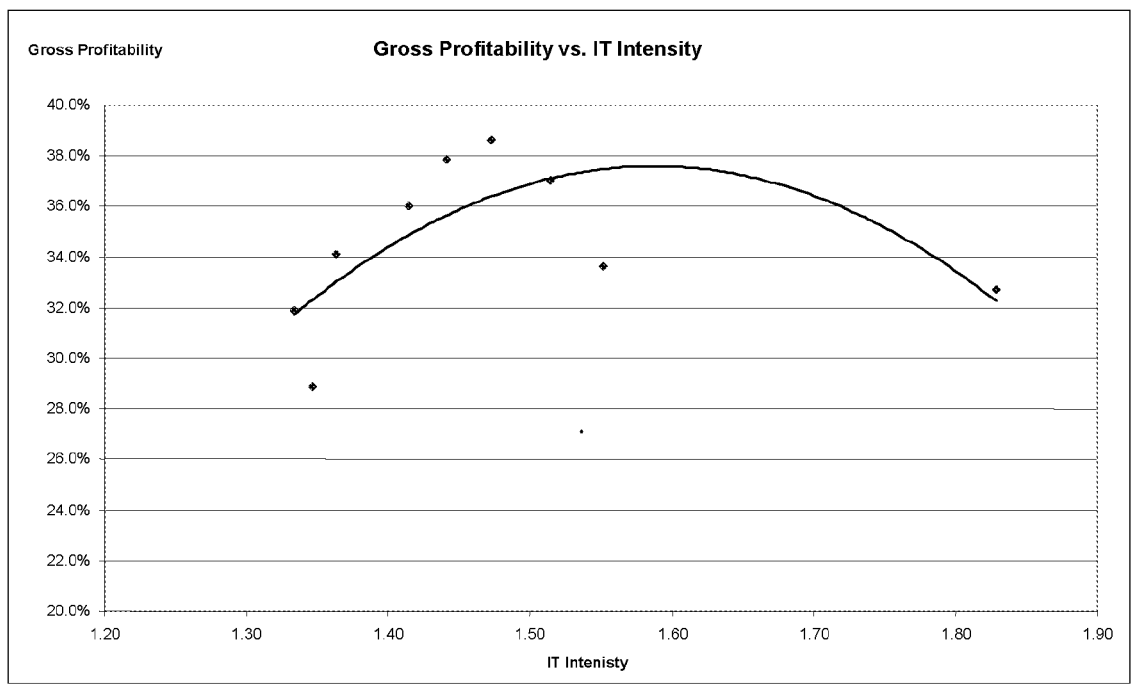
FIG. 1 is a graph illustrating the use of a benchmarking metric defined in accordance with the present invention.

Described herein are methods for benchmarking IT spending by an entity (e.g., a company). In one embodiment of the invention, IT spending by a subject entity is assessed against an industry-wide optimal value of an IT benchmark and a result of that assessment may be displayed. Importantly, the IT benchmark developed by the present inventor accounts for the subject entity's IT spending as a percentage of the entity's revenue and the entity's IT spending as a percentage of the entity's operating expenses. For the industry as a whole, the optimal value of the IT benchmark is determined on the basis of profitability measures for individual companies within the industry. This process may be performed as part of a larger analysis concerning the subject entity's operations to provide an overall assessment of the entity's financial performance, health, etc. The present invention thus provides a useful tool for consulting companies as well as the entity's decision makers.

Much of the following description will relate to algorithms suitable for implementation using one or more computer systems. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated by a computer system. It will be convenient at times, principally for reasons of common usage, to refer to the above-referenced signals as bits, values, elements, symbols, characters, terms, numbers or the like. It should be borne in mind, however, that all of these and similar terms are to be associated with the appropriate physical quantities and are merely convenient labels applied to these quantities.

Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Further, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software.

One of ordinary skill in the art will immediately appreciate that the invention can be practiced with computer system configurations of any type, including hand-held devices, multiprocessor systems, microprocessor-based or programmable consumer electronics, DSP devices, network PCs, minicomputers, mainframe computers, personal computers, and the like. The invention can also be practiced in distributed computing environments where tasks are performed by remote processing devices that are linked through a communications network.

IT spending can come in many forms, including amounts spent on computer hardware and software, support services and, potentially, outsourcing activities. Often, purchasers of IT services will enter into long-term service contracts with one or more service providers in order to address anticipated IT needs. Because it is often difficult to accurately estimate future prices for IT services and equipment, however, these service contacts typically include benchmarking provisions that tie the costs of equipment and services to a benchmark. Consequently, as indicated above, entire industries have developed in order to provide this benchmark information.

The present inventor has determined that historical measures used to benchmark IT spending provide little value to business leaders seeking to determine whether their organizations are getting the appropriate value for their level of IT spending. As alluded to above, the problem is not usually one of a lack of raw data regarding spending habits of other, perhaps similarly situated companies; but, rather, a lack of a meaningful metric which can be used to assess the value of such spending to the underlying organization.

Through empirical research, the inventor has developed a new metric for use in IT spending benchmarking processes. This metric will hereinafter be termed "IT Intensity" and it is computed as follows:

$$IT\_Intensity = \sqrt{(IT_{spend.revenue})^2 + (IT_{spend.op-exp})^2};$$

where:

$IT_{spend.revenue}$ is an entity's IT spending as a percentage of the entity's revenue; and $IT_{spend.op-exp}$ is an entity's IT spending as a percentage of the entity's operating expenses.

Thus, IT Intensity is a vector computed using various IT spending measures.

The inventor has determined that interesting and useful results can be obtained using the IT Intensity metric. For example, on an industry-by-industry basis, when various entities' Gross Profitability are plotted against their respective IT Intensity value, a characteristic curve is produced. The exact shape of the curve varies by industry, but the inventor has found that a curve having a defined maximum Gross Profitability will be obtained. An example of such a curve is shown in FIG. 1.

As illustrated in this diagram, the inventor has found that, on an industry-by-industry basis, below a certain IT Intensity, an entity's profitability is generally low (i.e., as measured against it's peers in the industry). As IT Intensity increases, so too does the Gross Profitability for companies in that industry, at least to a point. After that point of maximum Gross Profitability, for increasing IT Intensity profitability falls. As used herein, Gross Profitability is computed as follows:

$$\text{Gross\_Profitability} = \text{Net\_Revenue} - \frac{\text{Operating\_Expenses}}{\text{Net\_Revenue}}$$

The curve that is drawn through the various Gross Profitability/IT Intensity data points for a given industry may be determined using a conventional "best fit" algorithm. For example, a least mean square error curve fitting process or other curve fitting algorithm may be used. The inventor has used second order curve fitting algorithms in various embodiments of the invention to produce acceptable results.

Thus, IT Intensity provides a means for companies to evaluate their position within their respective industry. That is, IT Intensity provides a useful means for evaluating whether a company is over or under spending on IT initiatives. For example, using a Gross Profitability vs. IT Intensity curve for its particular industry, a company could readily determine the optimal IT Intensity value as a measure of Gross Profitability. By then computing its own IT Intensity and comparing it to the optimal value of same for the industry, the company can assess whether it is spending too much or too little on IT.

Figure 2:
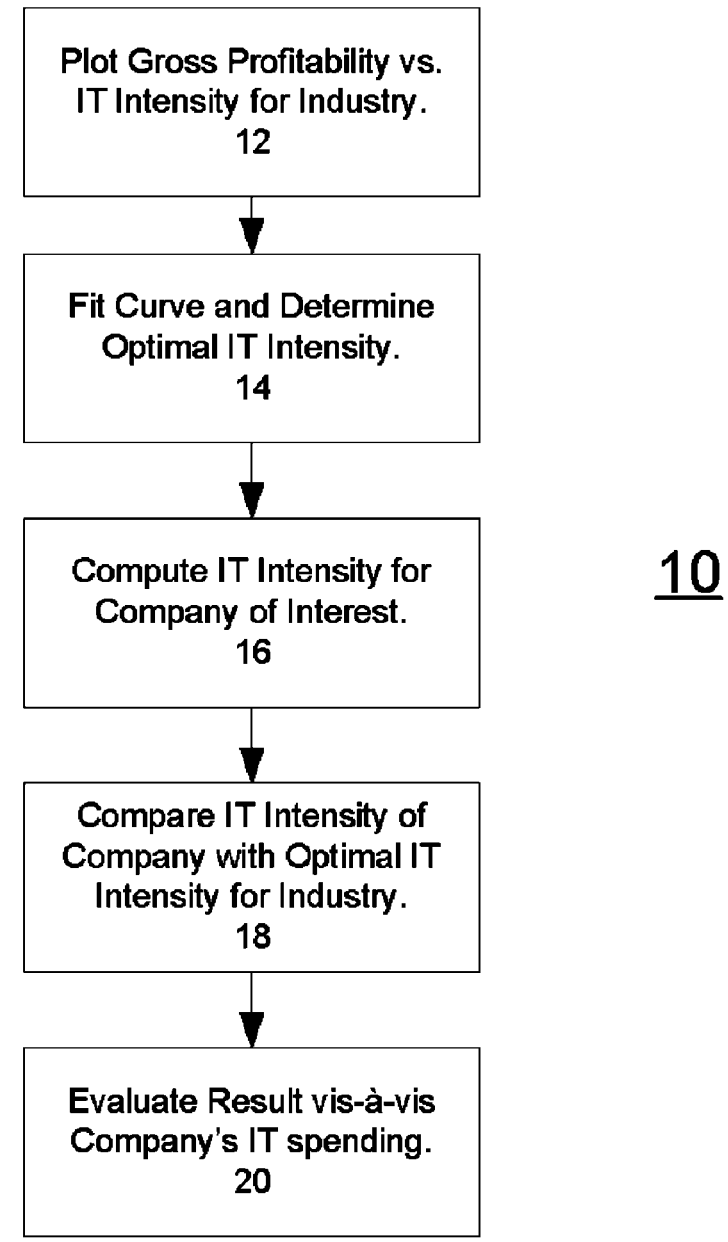
FIG. 2 is a flow diagram illustrating an example of a process for benchmarking an entity's IT spending in accordance with an embodiment of the present invention.

FIG. 2 illustrates an example of how such a process might be implemented. In this process 10, Gross Profitability for companies within a target industry is plotted against IT Intensity for each of the respective companies (12). Thereafter, a curve is fit through the data points and an optimal IT Intensity value for the industry determined according to a point of maximum Gross Profitability defined by the curve. (14) Several different curve fitting approaches may be used and a range of optimal IT Intensity values determined in this way. These various optimal IT Intensity values may be averaged or otherwise assessed to develop a single, optimal IT Intensity value for the subject industry.

Thereafter, for an individual target company the company's own IT Intensity value is computed (16) and compared with the optimal IT Intensity value determined above (18). The result (20) may be determinative of the company's spending on IT initiatives. For example, if the company's IT Intensity value is below that of the optimal IT Intensity value for the industry, this may be deemed to indicate that the company is spending too little on its IT initiatives. Conversely, if the company's IT Intensity value exceeds the optimal IT Intensity value for the industry, this may be deemed an indication that the company is spending too much on its IT initiatives. In all of these cases, the analysis may be displayed in any of a variety of forms (e.g., on computer monitors, in reports, etc.) so as to be communicated to interested parties.

Often, the above-described activities will be disjoint. That is, the determination of an optimum IT Intensity value for an industry will be done in advance of an individual company assessing its own IT Intensity value against that optimal value. Hence, simply because the above described process is shown in a single flow diagram, readers should not interpret this as requiring an immediate sequential process.

The assessment of a company's IT Intensity value against an industry-wide optimal value may be done as part of a larger analysis concerning the company's operations. Hence, such measures may be used in combination with other empirical or analytical results to provide an overall assessment of a company's financial performance, health, etc. The present invention thus provides a useful tool for consulting companies as well as internal company decision makers.

Thus, methods for benchmarking IT spending by an entity have been described. In accordance with these methods, assessments for IT spending by a company may be made by determining whether a value of an IT benchmark for the company is greater than or less than a value of the IT benchmark for an industry in which the company operates. As explained above, that IT benchmark may be computed based on the company's IT spending as a percentage of its revenue and the company's IT spending as a percentage of its operating expenses. Although discussed with reference to these illustrated embodiments, however, the present invention is not limited thereto inasmuch as these embodiments are intended solely to serve as examples.

What is claimed is:

1. A process for evaluating sufficiency of spending on information technology (IT) resources by a target company, the process comprising:
one or more computer systems (i) determining, for a subject industry, as represented by a set of selected companies within the industry, an optimal value of an IT metric, said IT metric being a vector of IT spending having a value equal to a square root of a sum of a square of a subject entity's IT spending as a percentage of the subject entity's revenue and a square of the subject entity's IT spending as a percentage of the subject entity's operating expenses, the optimal value of the IT metric determined by a maximum value of a profitability metric for the selected companies; (ii) comparing a value of the IT metric computed for the target company with the optimal value of the IT metric for the subject industry; and (iii) based on a result of the comparison, determining whether the target company is spending more or less on IT resources than a benchmark amount indicated by the optimum value of the IT metric for the subject industry and providing an output of that determination.

2. The process of claim 1, wherein the profitability metric comprises gross profitability, which for each respective one of the selected companies is a value equal to net revenue of the respective company less a ratio of operating expenses to net revenue for the respective selected company.

3. The process of claim 1, wherein the optimal value of the IT metric is determined by fitting a curve through data points representing, for each respective selected company, a measure of the profitability metric versus the IT metric for the respective selected company.

4. The method of claim 1, wherein the optimal value of the IT metric is determined by fitting a plurality of curves through data points representing, for each respective selected company, a measure of the profitability metric versus the IT metric for the respective selected company, for each curve determining a respective optimal value of the IT metric, and averaging the respective optimal values of the IT metrics for each curve to arrive at the optimal value of the IT metric.

5. A computer-readable medium having stored thereon computer-readable instruction, which instructions when executed by a computer processor cause the processor to perform steps, comprising: determining, for a subject industry, as represented by a set of selected companies within the industry, an optimal value of an information technology (IT) metric, said IT metric being a vector of IT spending having a value equal to a square root of a sum of a square of a subject entity's IT spending as a percentage of the subject entity's revenue and a square of the subject entity's IT spending as a percentage of the subject entity's operating expenses, the optimal value of the IT metric determined by a maximum value of a profitability metric for the selected companies; comparing a value of the IT metric computed for a target company with the optimal value of the IT metric for the subject industry; and based on a result of the comparison, determining whether the target company is spending more or less on IT resources than a benchmark amount indicated by the optimum value of the IT metric for the subject industry and displaying an output of that determination.

6. The computer-readable medium of claim 5, wherein the profitability metric comprises gross profitability, which for each respective one of the selected companies is a value equal to net revenue of the respective company less a ratio of operating expenses to net revenue for the respective selected company.

7. The computer-readable medium of claim 5, wherein the optimal value of the IT metric is determined by fitting a curve through data points representing, for each respective selected company, a measure of the profitability metric versus the IT metric for the respective selected company.

8. The computer-readable medium of claim 5, wherein the optimal value of the IT metric is determined by fitting a plurality of curves through data points representing, for each respective selected company, a measure of the profitability metric versus the IT metric for the respective selected company, for each curve determining a respective optimal value of the IT metric, and averaging the respective optimal values of the IT metrics for each curve to arrive at the optimal value of the IT metric.

9. A method for assessing spending by a subject company on information technology (IT) resources, comprising one or more computer systems determining whether a value of an IT benchmark for the subject company is greater than or less than a value of the IT benchmark for an industry in which the subject company operates, said IT benchmark being a vector of IT spending having a value equal to a square root of a sum of a square of the subject company's IT spending as a percentage of the subject company's revenue and a square of the subject company's IT spending as a percentage of the subject company's operating expenses, and displaying a result of the determination.

10. The method of claim 9, wherein the value of the IT benchmark for the industry is determined according to an assessment of profitability for individual companies which are included in the industry.

11. The method of claim 10, wherein the value of the IT benchmark for the industry is an average value computed after multiple curve fitting operations over profitability information concerning the individual companies which are included in the industry.

* * * * *